United States Patent
Ogihara et al.

(10) Patent No.: US 7,913,109 B2
(45) Date of Patent: Mar. 22, 2011

(54) STORAGE CONTROL APPARATUS AND STORAGE CONTROL METHOD

(75) Inventors: Kazutaka Ogihara, Kawasaki (JP); Tatsuo Kumano, Kawasaki (JP); Kazuichi Oe, Kawasaki (JP); Takashi Watanabe, Kawasaki (JP); Masahisa Tamura, Kawasaki (JP); Yoshihiro Tsuchiya, Kawasaki (JP); Tetsutaro Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 338 days.

(21) Appl. No.: 12/273,254

(22) Filed: Nov. 18, 2008

(65) Prior Publication Data

US 2009/0164839 A1    Jun. 25, 2009

(30) Foreign Application Priority Data

Dec. 21, 2007 (JP) .................... 2007-330634

(51) Int. Cl.
G06F 11/00 (2006.01)
(52) U.S. Cl. .............................. 714/6; 714/7
(58) Field of Classification Search ............ 714/6, 7, 714/8
See application file for complete search history.

(56) References Cited

U.S. PATENT DOCUMENTS

| | | | | |
|---|---|---|---|---|
| 6,922,763 B2 * | 7/2005 | Suzuki et al. | ................. | 711/162 |
| 7,076,620 B2 * | 7/2006 | Takeda et al. | ................. | 711/161 |
| 7,275,179 B1 * | 9/2007 | Coatney | ..................... | 714/7 |
| 7,281,158 B2 * | 10/2007 | Yamamoto et al. | ............... | 714/7 |
| 7,386,755 B2 * | 6/2008 | Eguchi et al. | ..................... | 714/6 |
| 7,421,614 B2 * | 9/2008 | Watanabe | ......................... | 714/6 |
| 2005/0172166 A1 | 8/2005 | Eguchi et al. | | |
| 2006/0101214 A1 | 5/2006 | Mikami | | |
| 2006/0236056 A1 * | 10/2006 | Nagata | ..................... | 711/165 |
| 2006/0248297 A1 | 11/2006 | Watanabe et al. | | |
| 2007/0162717 A1 | 7/2007 | Mikami | | |
| 2008/0250079 A1 | 10/2008 | Eguchi et al. | | |

FOREIGN PATENT DOCUMENTS

| | | | |
|---|---|---|---|
| EP | 1 562 117 A2 | 8/2005 |
| EP | 1 662 392 A2 | 5/2006 |
| EP | 1 717 689 A1 | 11/2006 |
| EP | 1 720 101 A1 | 11/2006 |
| JP | A 10-124261 | 5/1998 |

* cited by examiner

*Primary Examiner* — Joshua A Lohn
(74) *Attorney, Agent, or Firm* — Greer, Burns & Crain, Ltd.

(57) ABSTRACT

A storage control apparatus monitors whether or not one or more storage management apparatuses are properly operating. A recovery target extraction unit extracts a recovery target storage area when the existence of a malfunctioning storage management apparatus is detected, the recovery target storage area being a storage area that has been duplexed with a storage area of the malfunctioning storage management apparatus. A duplexing control unit performs control so that, if the recovery target storage area has no data stored therein, the recovery target storage area is duplexed with a storage area that has no data stored therein and that is unused. If the recovery target storage area has data stored therein, the recovery target storage area is duplexed with a non-duplexed storage area and the data stored in the recovery target storage area is copied into the non-duplexed storage area.

9 Claims, 13 Drawing Sheets

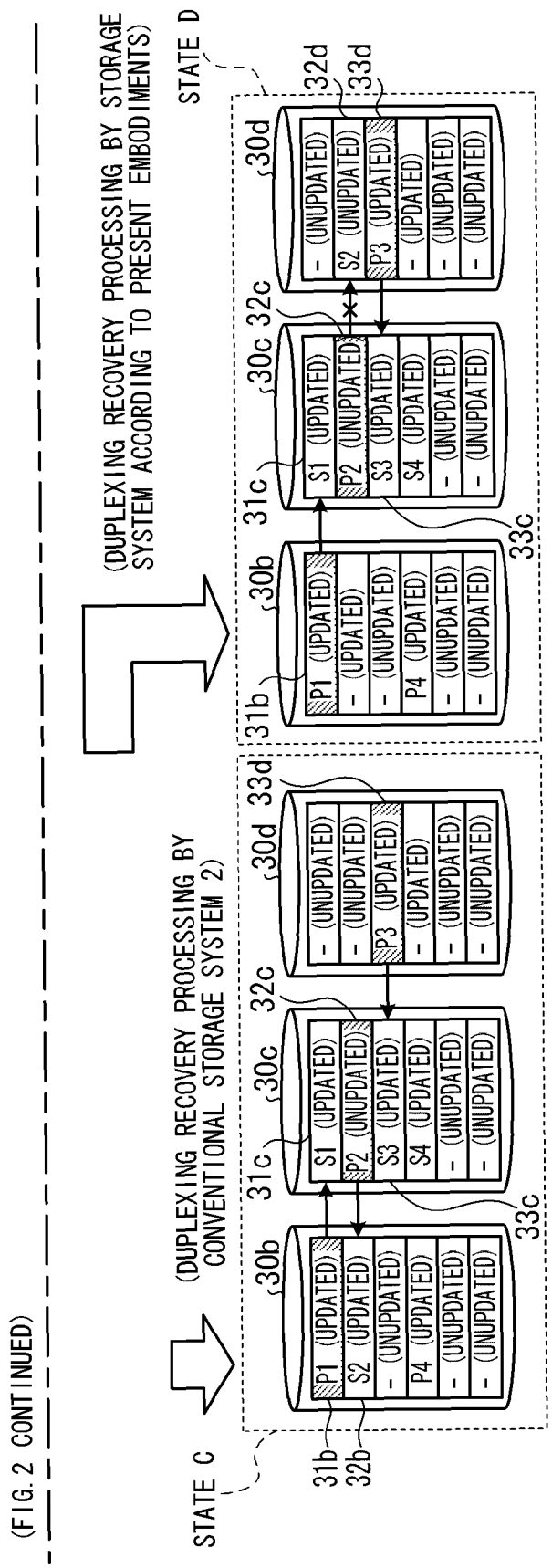

FIG. 4A

| STORAGE ID | SLICE ID | ATTRIBUTE | LOGICAL VOLUME INFORMATION | | DUPLEXING COUNTERPART INFORMATION | | DATA UPDATE FLAG |
|---|---|---|---|---|---|---|---|
| | | | LOGICAL VOLUME ID | SEGMENT ID | STORAGE ID | SLICE ID | |
| 30a | 1001 | PRIMARY | A | 1 | 30b | 1001 | 1 |
| | 1002 | SECONDARY | A | 2 | 30c | 1002 | 0 |
| | 1003 | PRIMARY | A | 3 | 30d | 1003 | 1 |
| | 1004 | — | — | — | — | — | 0 |
| | 1005 | — | — | — | — | — | 0 |
| | 1006 | — | — | — | — | — | 0 |
| 30b | 1001 | SECONDARY | A | 1 | 30a | 1001 | 1 |
| | 1002 | — | — | — | — | — | 1 |
| | 1003 | — | — | — | — | — | 0 |
| | 1004 | PRIMARY | A | 4 | 30c | 1004 | 1 |
| | 1005 | — | — | — | — | — | 0 |
| | 1006 | — | — | — | — | — | 0 |
| 30c | 1001 | — | — | — | — | — | 1 |
| | 1002 | PRIMARY | A | 2 | 30a | 1002 | 0 |
| | 1003 | — | — | — | — | — | 1 |
| | 1004 | SECONDARY | A | 4 | 30b | 1004 | 1 |
| | 1005 | — | — | — | — | — | 0 |
| | 1006 | — | — | — | — | — | 0 |
| 30d | 1001 | — | — | — | — | — | 0 |
| | 1002 | — | — | — | — | — | 0 |
| | 1003 | SECONDARY | A | 3 | 30a | 1003 | 1 |
| | 1004 | — | — | — | — | — | 1 |
| | 1005 | — | — | — | — | — | 0 |
| | 1006 | — | — | — | — | — | 0 |

| STORAGE ID | SLICE ID | ATTRIBUTE | LOGICAL VOLUME INFORMATION | | DUPLEXING COUNTERPART INFORMATION | | DATA UPDATE FLAG |
|---|---|---|---|---|---|---|---|
| | | | LOGICAL VOLUME ID | SEGMENT ID | STORAGE ID | SLICE ID | |
| 30b | 1001 | SECONDARY | A | 1 | 30a | 1001 | 1 |
| | 1002 | — | — | — | — | — | 1 |
| | 1003 | — | — | — | — | — | 0 |
| | 1004 | PRIMARY | A | 4 | 30c | 1004 | 1 |
| | 1005 | — | — | — | — | — | 0 |
| | 1006 | — | — | — | — | — | 0 |
| 30c | 1001 | — | — | — | — | — | 1 |
| | 1002 | PRIMARY | A | 2 | 30a | 1002 | 0 |
| | 1003 | — | — | — | — | — | 1 |
| | 1004 | SECONDARY | A | 4 | 30b | 1004 | 1 |
| | 1005 | — | — | — | — | — | 0 |
| | 1006 | — | — | — | — | — | 0 |
| 30d | 1001 | — | — | — | — | — | 0 |
| | 1002 | — | — | — | — | — | 0 |
| | 1003 | SECONDARY | A | 3 | 30a | 1003 | 1 |
| | 1004 | — | — | — | — | — | 1 |
| | 1005 | — | — | — | — | — | 0 |
| | 1006 | — | — | — | — | — | 0 |

FIG. 5A

| LOGICAL VOLUME ID | SEGMENT ID | PRIMARY INFORMATION | | | SECONDARY INFORMATION | | |
|---|---|---|---|---|---|---|---|
| | | STORAGE ID | SLICE ID | DATA UPDATE FLAG | STORAGE ID | SLICE ID | DATA UPDATE FLAG |
| A | 1 | 30a | 1001 | 1 | 30b | 1001 | 1 |
| | 2 | 30c | 1002 | 0 | 30a | 1002 | 0 |
| | 3 | 30a | 1003 | 1 | 30d | 1003 | 1 |
| | 4 | 30b | 1004 | 1 | 30c | 1004 | 1 |

| LOGICAL VOLUME ID | SEGMENT ID | PRIMARY INFORMATION | | | SECONDARY INFORMATION | | |
|---|---|---|---|---|---|---|---|
| | | STORAGE ID | SLICE ID | DATA UPDATE FLAG | STORAGE ID | SLICE ID | DATA UPDATE FLAG |
| A | 1 | — | — | — | 30b | 1001 | 1 |
| | 2 | 30c | 1002 | 0 | — | — | — |
| | 3 | — | — | — | 30d | 1003 | 1 |
| | 4 | 30b | 1004 | 1 | 30c | 1004 | 1 |

122

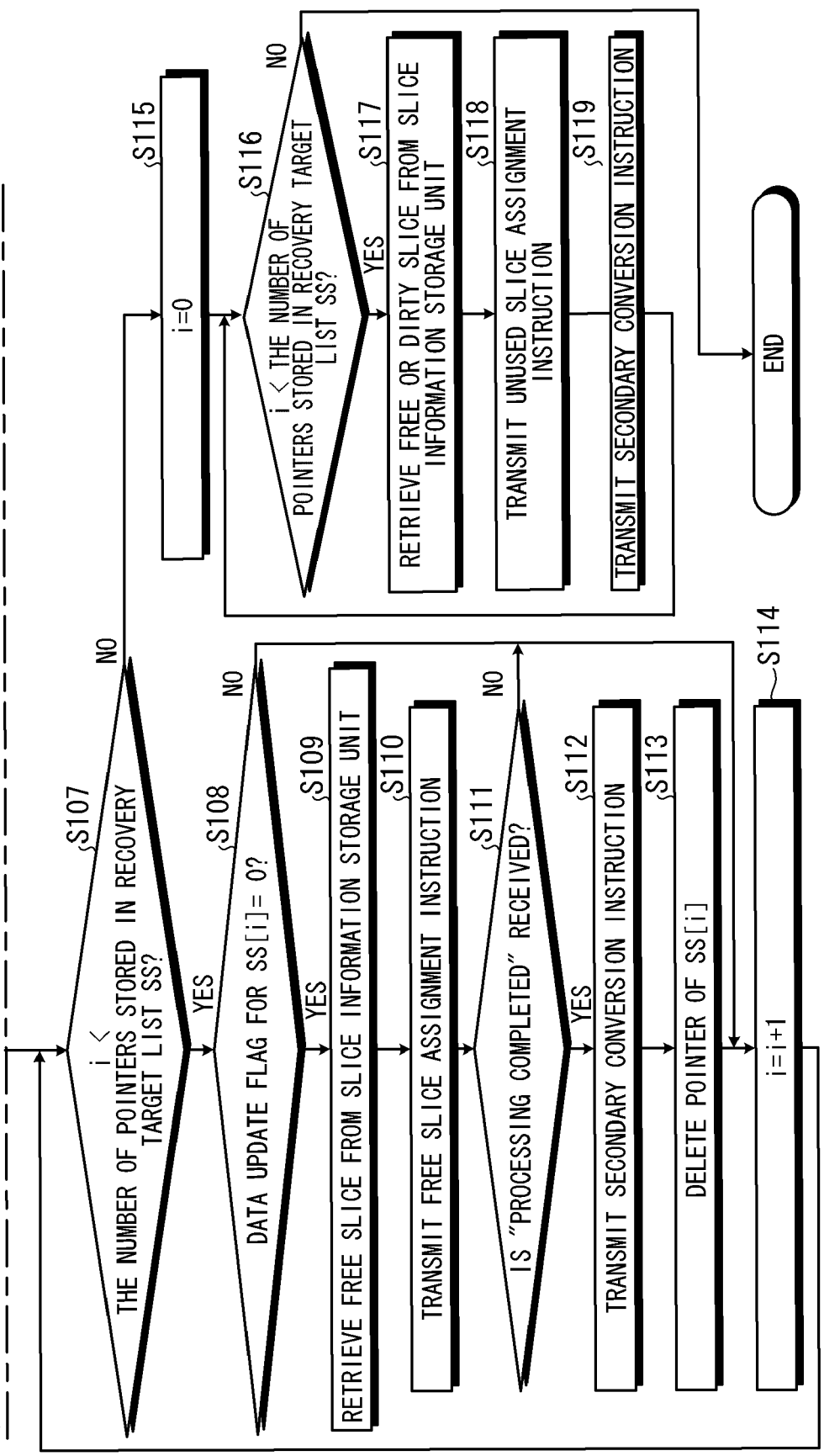

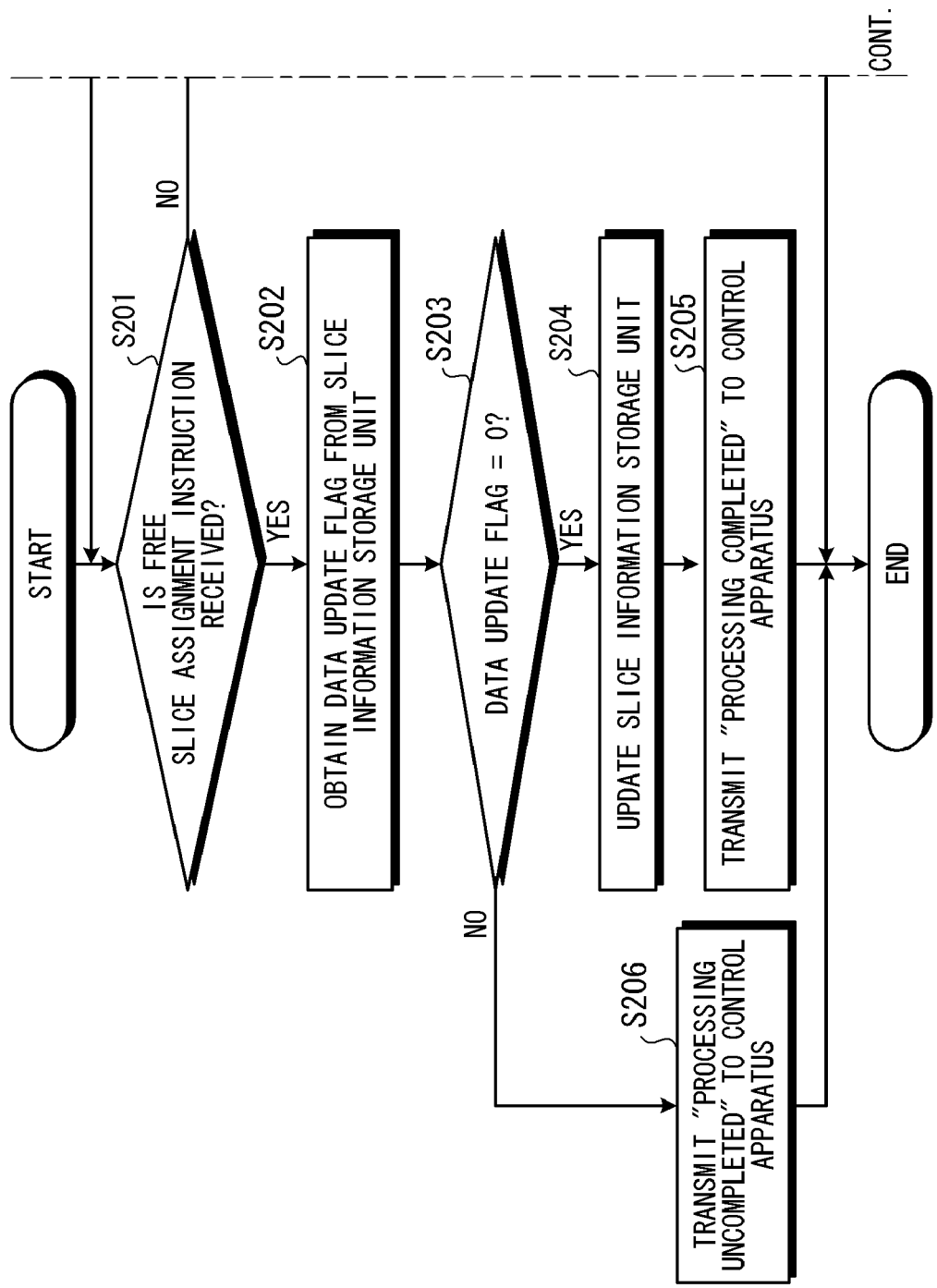

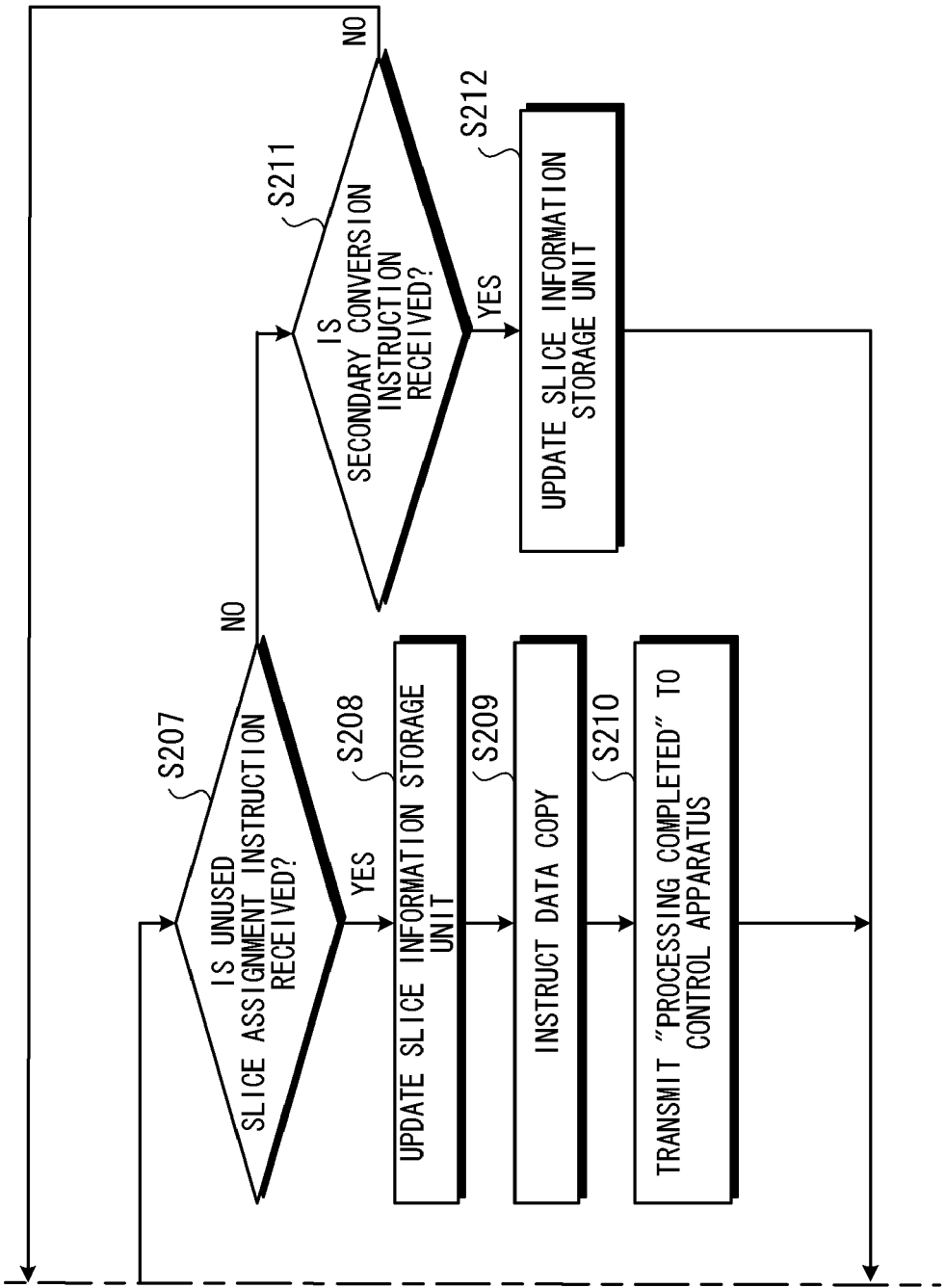

STORAGE CONTROL APPARATUS AND STORAGE CONTROL METHOD

CROSS-REFERENCE TO RELATED APPLICATIONS

This application is based upon and claims the benefit of priority from prior Japanese Patent Application No. 2007-330634 filed on Dec. 21, 2007, the entire contents of which are incorporated herein by reference.

BACKGROUND

1. Field

The present invention relates to a storage control apparatus, a storage medium having a storage control program stored thereon, and a storage control method.

2. Description of the Related Art

As a data input/output apparatus, a storage system may be used that includes a plurality of storage devices and control devices controlling the storage devices. For such a storage system, there is a technique for managing data by duplexing storage areas between different storage devices in order to prevent data from being lost if one of the storage devices fails (Japanese Patent Laid-Open No. 10-124261).

SUMMARY

According to an aspect of the present invention, there is provided a storage control apparatus that performs control so that storage areas of different storage management apparatuses are duplexed. The apparatus includes: monitoring means for monitoring whether or not the storage management apparatuses are properly operating; and recovery target extraction means for extracting a recovery target storage area when the existence of a malfunctioning storage management apparatus is detected by the monitoring means. The recovery target storage area is a storage area that has been duplexed with a storage area of the malfunctioning storage management apparatus. Duplexing control means performs control so that, if the recovery target storage area extracted by the recovery target extraction means has no data stored therein, the recovery target storage area is duplexed with a storage area that has no data stored therein and that is unused, and if the recovery target storage area extracted by the recovery target extraction means has data stored therein, the recovery target storage area is duplexed with a non-duplexed storage area, and the data stored in the recovery target storage area is copied into the non-duplexed storage area.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIGS. 2A and 2B are a diagram for describing the overview of duplexing recovery processing by the storage system according to the embodiments;

FIG. 4A is a diagram showing an example of a slice information storage unit;

FIG. 4B is a diagram showing an example of the slice information storage unit;

FIG. 5A is a diagram showing an example of a segment information storage unit;

FIG. 5B is a diagram showing an example of the segment information storage unit;

FIGS. 7A and 7B are a flowchart showing the steps of the duplexing recovery processing by the control apparatus shown in FIG. 1; and FIGS. 8A and 8B are a flowchart showing the steps of the duplexing recovery processing by the storage management apparatus shown in FIG. 1.

DETAILED DESCRIPTION OF THE PREFERRED EMBODIMENTS

When a failure occurs in a storage device and storage areas therein are no more duplexed, it may be possible to automatically recover the duplexing of the storage areas. For example, when a failure in a storage device is detected, a management apparatus can cause storage areas that have been duplexed with storage areas in the failed storage device (hereafter, storage areas that have been duplexed with storage areas in a failed storage device will be referred to as "recovery target storage areas") to be duplexed with storage areas in other properly operating storage devices. By controlling the storage devices to be always kept duplexed, a storage system can secure the system reliability.

A problem with duplexing recovery processing by the storage system disclosed in the aforementioned patent document (Japanese Patent Laid-Open No. 10-124261) is that it takes a very long time. Specifically, processing for copying data stored in the recovery target storage area into the new storage area to be duplexed is time-consuming.

In recent years, the disk capacity accommodated by storage systems has been increasing, and as much as 1 TB (terabyte) of data or more may have to be copied at the occurrence of a failure in one storage device. In such cases, it may take as much as several tens of hours to complete the duplexing recovery processing. In addition, during the duplexing recovery processing, a failure can occur in a storage device to which a recovery target storage area belongs. Under such conditions, how to realize a storage system capable of reducing the time required for the duplexing recovery processing has become an important problem.

The technique disclosed in the aforementioned patent document assumes that all the disk devices are properly restarted. The technique cannot be applied to processing for recovering the duplexing at the occurrence of a disk device failure.

Thus, the inventor has invented a storage control apparatus capable of reducing the time required for the duplexing recovery processing.

Embodiments according to the present invention will be described in detail below with reference to the accompanying drawings. It is noted that the embodiments below are not intended to limit the present invention.

Figure 1:
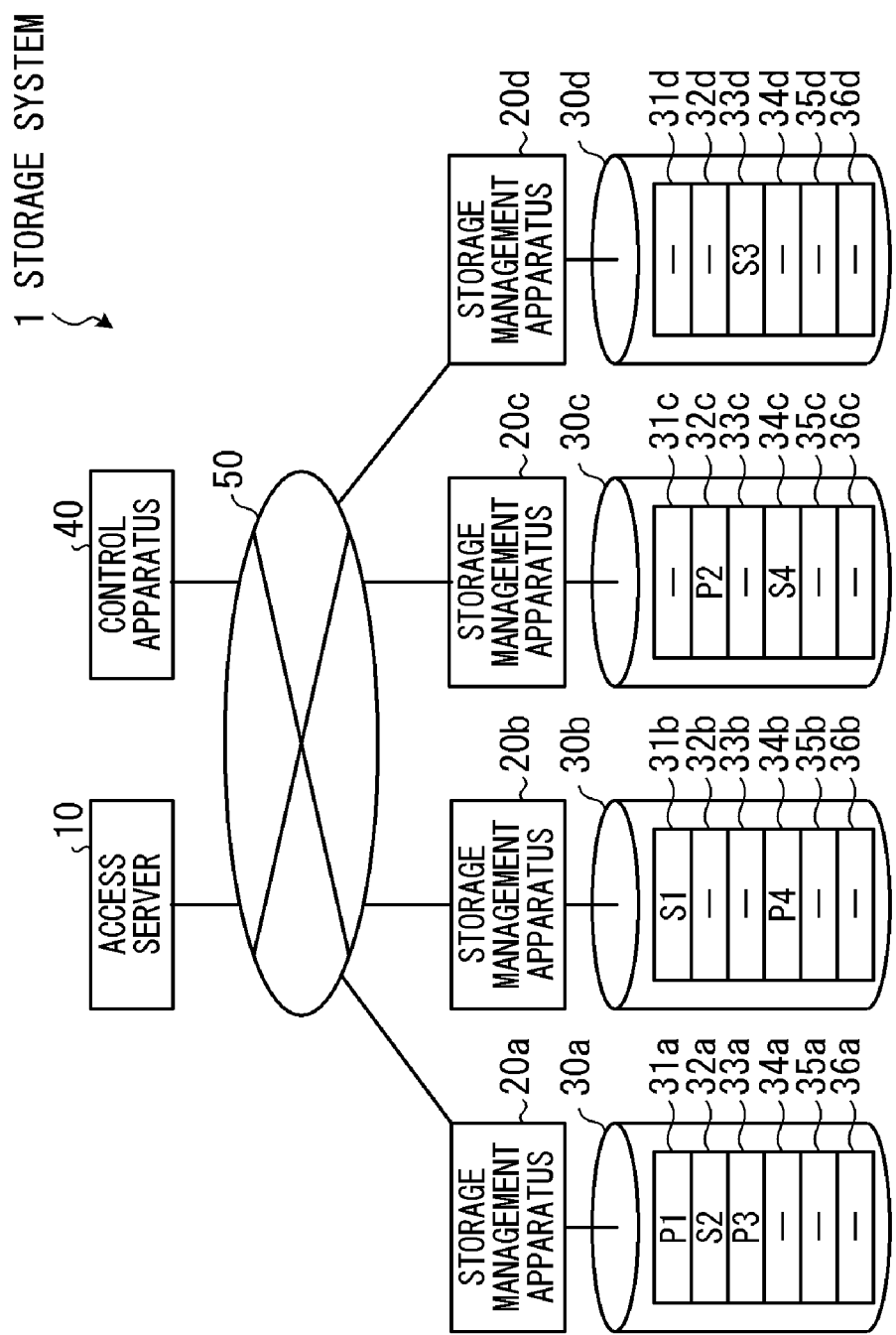
FIG. 1 is a diagram showing an exemplary configuration of a storage system according to embodiments.

First, the configuration of a storage system according to the embodiments will be described. FIG. 1 is a diagram showing an exemplary configuration of the storage system according to the embodiments. As shown, the storage system 1 includes an access server 10, storage management apparatuses 20a to 20d, storage devices 30a to 30d, and a control apparatus 40. The access server 10, the storage management apparatuses 20a to 20d, and the control apparatus 40 are communicatively interconnected over a network 50.

The access server 10, connected with a plurality of user terminals (not shown), is an apparatus that controls data accesses between the user terminals and the storage devices 30a to 30d. For example, the access server 10 sends data read requests and write requests to the storage devices 30a to 30d.

The storage management apparatuses 20a to 20d, involving the storage devices 30a to 30d, are apparatuses that manage the storage devices 30a to 30d. The storage devices 30a to 30d are not limited to hard disk devices but may be other storage devices such as thermomagnetic disk devices and magneto-optical disk devices.

The storage management apparatuses 20a to 20d manage storage areas in the storage devices 30a to 30d by dividing each storage area by a certain size. Each portion of a storage area divided by the certain size will herein be called a "slice."

In the example shown in FIG. 1, the storage management apparatus 20a manages the storage area in the storage device 30a by dividing it into six slices 31a to 36a. Similarly, the storage management apparatus 20b manages the storage area in the storage device 30b by dividing it into six slices 31b to 36b. While all the storage management apparatuses 20a to 20d divide their storage areas into the same number of slices, i.e., six slices, the number of slices may vary among the storage management apparatuses.

In the storage system 1 according to the embodiments, the storage areas in the storage devices 30a to 30d are treated as logical volumes (also called "logical disks") which are virtual storage areas. A logical volume consists of one or more segments. A "segment" as used herein is a storage area such that two slices belonging to different storage devices 30a to 30d are duplexed with each other.

One of the slices forming a segment is called "primary" while the other slice is called "secondary." When the storage devices 30a to 30d receive a data read request, they read out data stored in a primary slice. When the storage devices 30a to 30d receive a data write request, they perform processing for writing data to both primary and secondary slices.

In the slices 31a to 36a, 31b to 36b, 31c to 36c, and 31d to 36d in FIG. 1, "P" denotes primary, "S" denotes secondary, and "– (unset)" denotes an unused slice rather than a slice that forms part of a logical volume. The number after "P" or "S" denotes an identifier (segment ID) for identifying a segment. Unused slices are classified into two types depending on the data storage state. One type of unused slices are those to which no data has been written since the initialized state, and such slices will hereafter be called "free." The other type of unused slices are those to which data has possibly been written, and such slices will hereafter be called "dirty."

In the storage system 1 in FIG. 1, a logical volume consists of a segment (segment ID "1") formed of the duplexed slices 31a and 31b, a segment (segment ID "2") formed of the duplexed slices 32a and 32c, a segment (segment ID "3") formed of the duplexed slices 33a and 33d, and a segment (segment ID "4") formed of the duplexed slices 34b and 34c. While FIG. 1 illustrates the case where only one logical volume exists, more than one logical volume may exist. While FIG. 1 illustrates the case each duplexed slices are set on the same slice position. For example, "P1" and "S1" are set on the first slice position (31a and 31b), and "P2" and "S2" are set on the second slice position (32c and 32a). The duplexed slices can be set on the different slice position. For example, setting "P1" on the second position slice (ex. 32a) and "S1" on the forth position slice (ex. 34b) is acceptable.

This logical volume structure can be known from slice information that exists for each slice. The slice information is various kinds of information about the slice, including a slice ID for identifying the slice within a certain one of the storage devices 30a to 30d, an attribute for identifying primary or secondary, a segment ID of a segment to which the slice belongs, duplexing counterpart information about a slice with which the slice is duplexed, and so on.

The slice information is stored by the storage management apparatuses 20a to 20d in nonvolatile storage media such as disks. Specifically, the storage management apparatus 20a stores the slice information about the slices belonging to the storage device 30a, and the storage management apparatus 20b stores the slice information about the slices belonging to the storage device 30b.

The control apparatus 40 monitors the operation state of the storage management apparatuses 20a to 20d and performs duplexing recovery processing for any non-duplexed segments. For example, at the occurrence of a failure in one storage device, each segment that has been partially formed of a slice belonging to the failed storage device is now formed of only one slice. When the control apparatus 40 detects such a state and recognizes the failure in the storage device, it causes the slices that have been duplexed with the slices belonging to the failed storage device (hereafter, slices that have been duplexed with slices belonging to a failed storage device will be referred to as "recovery target slices") to be duplexed with slices belonging to other properly operating storage devices.

Figure 2A:
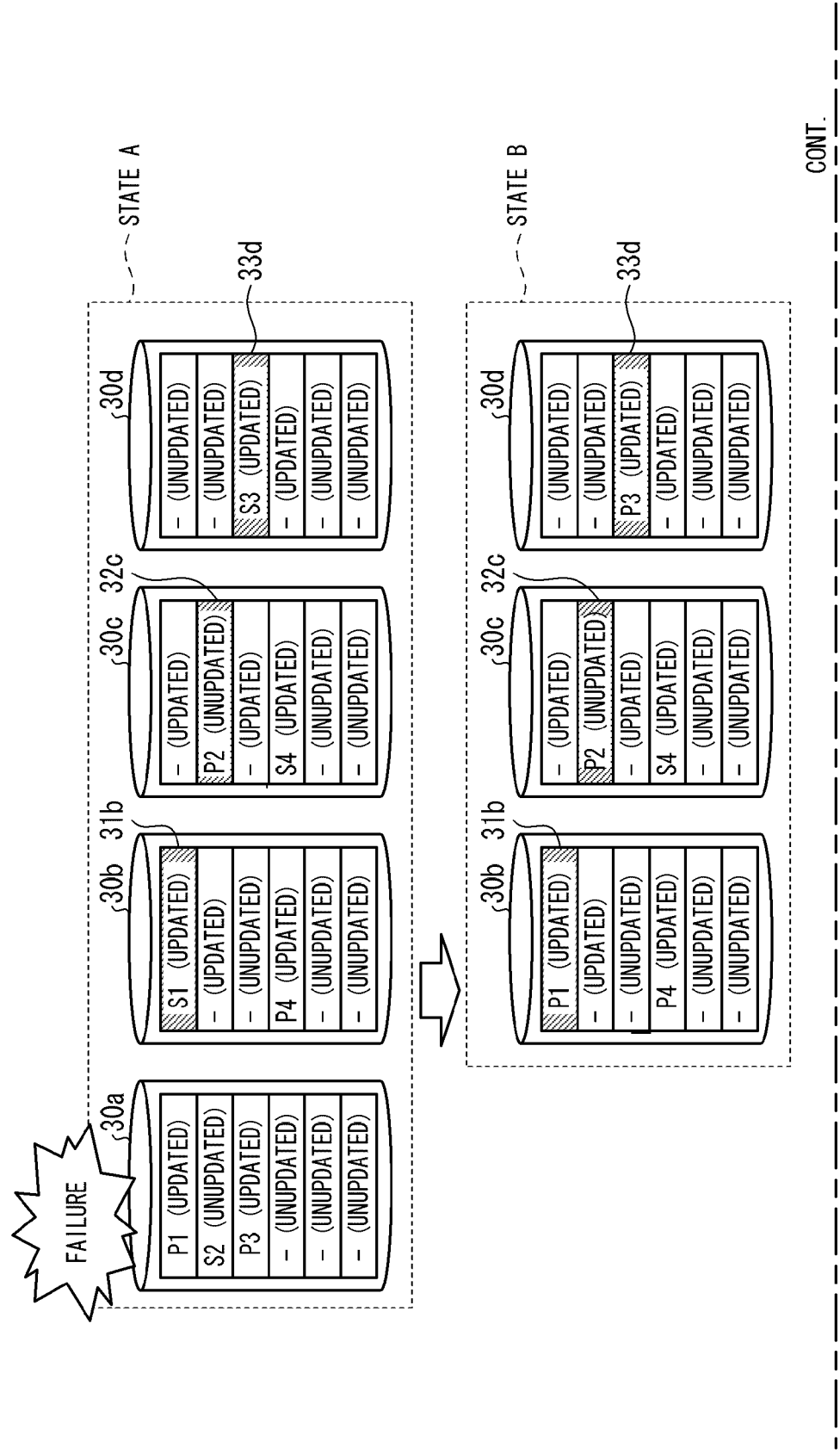

Now, the overview of the duplexing recovery processing by the storage system 1 according to the embodiments will be described. FIGS. 2A and 2B are a diagram for describing the overview of the duplexing recovery processing by the storage system 1 according to the embodiments. In the following description, duplexing recovery processing by a conventional storage system will also be described in order to clarify the characteristics of the duplexing recovery processing by the storage system 1 according to the embodiments. In each slice shown, "updated" denotes that data is stored in the slice, and "unupdated" denotes that the slice is in the initialized state with no data stored therein.

As illustrated in "State A" in the example of FIGS. 2A and 2B, at the occurrence of a failure in the storage device 30a, segments with the segment IDs "1" to "3" are now formed of only one slice. That is, the slices 31b, 32c, and 33d are not duplexed and need to be duplexed with slices belonging to other properly operating storage devices 30b to 30d. In the drawing, the recovery target slices are shown hatched.

When the storage system 1 detects the failure in the storage device 30a, it makes all the recovery target slices primary. Specifically, as illustrated in "State B" shown, the recovery target slices 31b, 32c, and 33d are made primary. The reason why the recovery target slices are made primary in this manner is to enable data accesses to the recovery target slices even during the duplexing recovery processing. Since the slice 32c is originally primary, the storage system 1 does not need to perform processing for making the slice 32c primary.

The storage system 1 then duplexes the recovery target slices with unused slices belonging to other properly operating storage devices. This duplexing processing will be specifically described for the conventional storage system 2 and for the storage system 1 according to the embodiments.

In the conventional storage system 2, unused slices to be duplexed with the recovery target slices are determined. Then, data stored in the recovery target slices is copied into the slices to be duplexed.

As illustrated in "State C" in the example of FIGS. 2A and 2B, the conventional storage system 2 designates the slice 31c as the slice to be duplexed with the slice 31b and copies data stored in the slice 31b into the slice 31c. Similarly, the conventional storage system 2 determines the slice 32b as the slice to be duplexed with the slice 32c and copies data stored in the slice 32c into the slice 32b, and designates the slice 33c as the slice to be duplexed with the slice 33d and copies data stored in the slice 33d into the slice 33c. In this manner, in the conventional storage system 2, the duplexing is recovered for each segment by determining the slice to be duplexed with the recovery target slice and by copying data in the recovery target slice into the slice to be duplexed with the recovery target slice.

However, since the conventional storage system 2 performs the data copy processing without exception, the duplexing recovery processing is time-consuming. With the possibility of a failure occurring in the storage devices 30b to 30d during the duplexing recovery processing, this time-consuming duplexing recovery processing is a problem.

To solve this problem, the storage system 1 according to the embodiments determines whether or not the data copy processing is necessary, and if not, does not perform the copy processing.

Specifically, the storage system 1 according to the embodiments determines whether or not data is stored in a recovery target slice. If no data is stored in the recovery target slice, the storage system 1 duplexes the recovery target slice with a free slice. Here, the storage system 1 does not copy data stored in the recovery target slice into the free slice to be duplexed because the recovery target slice with no data stored therein and the free slice are both in the initialized state and do not require the data copy processing.

If data is stored in the recovery target slice, the storage system 1 designates a slice to be duplexed and copies the data stored in the recovery target slice into the slice to be duplexed, as in the conventional storage system 2.

In the example shown in FIGS. 2A and 2B, as illustrated in "State D," since data is stored in the slice 31b, the storage system 1 duplexes the slice 31b with the slice 31c and copies the data stored in the slice 31b into the slice 31c. Similarly, since data is stored in the slice 33d, the storage system 1 duplexes the slice 33d with the slice 33c and copies the data stored in the slice 33d into the slice 33c. On the other hand, since no data is stored in the slice 32c, the storage system 1 duplexes the slice 32c with the free slice 32d but does not perform the data copy processing.

In this manner, the storage system 1 according to the embodiments determines whether or not data is stored in a recovery target slice. If data is stored, the storage system 1 duplexes the recovery target slice with an unused slice and performs the data copy processing. If no data is stored in the recovery target slice, the storage system 1 duplexes the recovery target slice with a free slice and does not perform the data copy processing. Therefore, the time required for the copy processing can be eliminated. As a result, the time required for the duplexing recovery processing can be reduced.

Figure 3:
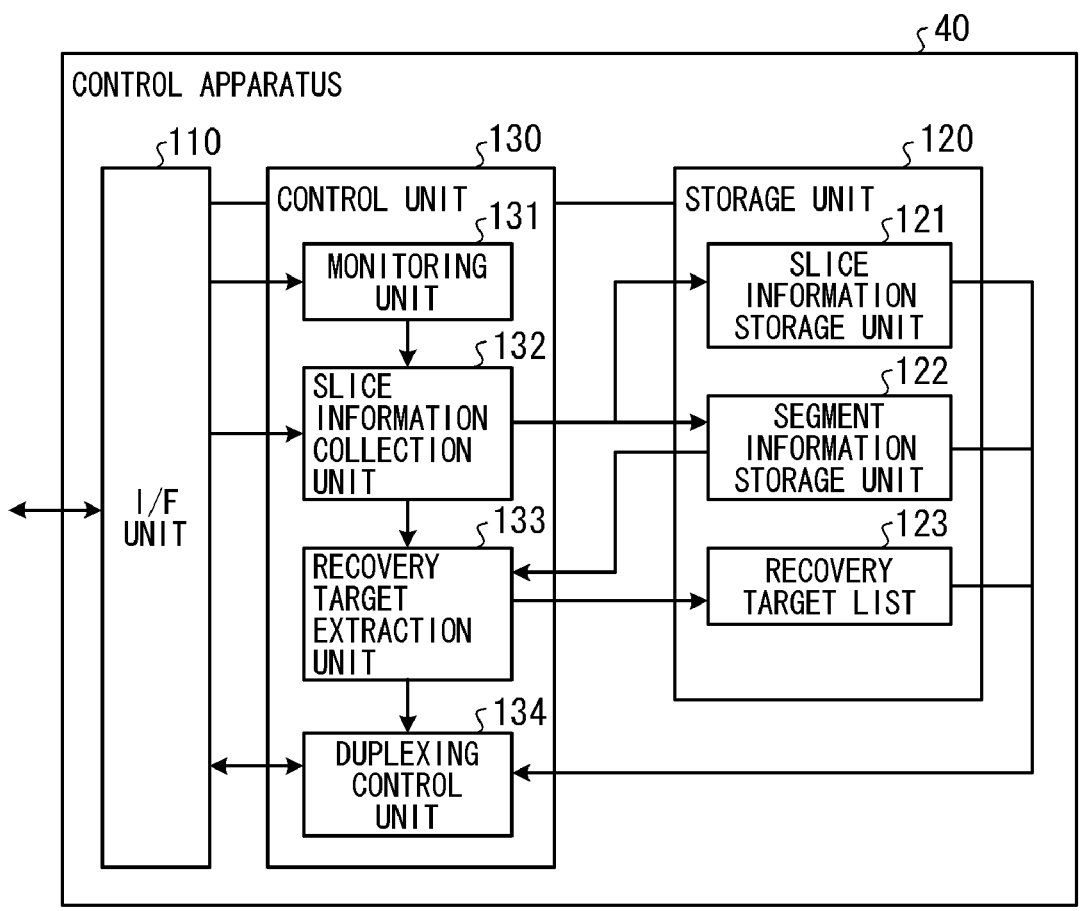
FIG. 3 is a functional block diagram showing the configuration of a control apparatus shown in FIG. 1.

Now, the configuration of the control apparatus 40 shown in FIG. 1 will be described. FIG. 3 is a functional block diagram showing the configuration of the control apparatus 40 shown in FIG. 1. As shown, the control apparatus 40 includes an interface (hereafter referred to as "I/F") unit 110, a storage unit 120, and a control unit 130. The I/F unit 110 is an interface device for implementing network communication.

The storage unit 120 is a storage device that stores various kinds of information and includes a slice information storage unit 121, a segment information storage unit 122, and a recovery target list 123. The slice information storage unit 121 is a storage area that stores the slice information maintained by the properly operating storage management apparatuses 20a to 20d. This slice information storage unit 121 is generated by a slice information collection unit 132 to be described later.

FIGS. 4A and 4B show examples of the slice information storage unit 121. As shown in FIGS. 4A and 4B, the slice information storage unit 121 includes items such as a storage ID, a slice ID, an attribute, logical volume information, duplexing counterpart information, and a data update flag, such that each storage ID can have a plurality of values of each item.

The storage ID is an identifier for identifying the storage devices 30a to 30d. In the examples of FIGS. 4A and 4B, the symbols given to the storage devices 30a to 30d in FIG. 1 are used as the storage IDs.

The slice ID is an identifier for identifying a slice within a certain one of the storage devices 30a to 30d. The attribute is information indicating whether the slice is primary or secondary. If the attribute is unset ("–" in the examples shown in FIGS. 4A and 4B), it indicates that the slice is an unused slice.

The logical volume information stores a logical volume ID for identifying a logical volume, and a segment ID for identifying a segment. The duplexing counterpart information stores a storage ID and a slice ID of a counterpart slice with which the slice is duplexed.

The data update flag is a flag indicating whether or not data is stored in the slice. In this figure, the data update flag "0" indicates that no data is stored in the slice, whereas the data update flag "1" indicates that data is stored in the slice.

The slice information storage unit 121 shown in FIG. 4A represents the state generated by the slice information collection unit 132 before the occurrence of the failure in the storage device 30a in FIG. 2A. The slice information storage unit 121 shown in FIG. 4B represents the state generated by the slice information collection unit 132 after the occurrence of the failure in the storage device 30a in FIG. 2A.

The first row of the slice information storage unit 121 shown in FIG. 4A indicates that a slice with the slice ID "1001" belonging to the storage device 30a is primary and belongs to the segment ID "1" in the logical volume ID "A." It also indicates that this slice is duplexed with a slice with the slice ID "1001" belonging to the storage device 30b. It further indicates that data is stored in this slice.

The fourth row of the slice information storage unit 121 shown in FIG. 4A indicates that a slice with the slice ID "1004" belonging to the storage device 30a is free. The eighth row of the slice information storage unit 121 shown in FIG. 4A indicates that a slice with the slice ID "1002" belonging to the storage device 30b is dirty.

The segment information storage unit 122 is a storage area that stores various kinds of information about the segments forming the logical volume. This segment information storage unit 122 is generated at the occurrence of a failure in any of the storage devices 30a to 30d by the slice information collection unit 132 to be described later based on the slice information maintained by the properly operating storage devices 30a to 30d.

FIGS. 5A and 5B show examples of the segment information storage unit 122. As shown in FIGS. 5A and 5B, the segment information storage unit 122 includes items such as a logical volume ID, a segment ID, primary information, and secondary information.

The primary information is information about a primary slice that forms part of a segment, and it stores a storage ID, a slice ID, and a data update flag. The secondary information is information about a secondary slice that forms part of a segment, and it stores a storage ID, a slice ID, and a data update flag.

The segment information storage unit 122 shown in FIG. 5A represents the state generated by the slice information collection unit 132 before the occurrence of the failure in the storage device 30*a* in FIG. 2A. The segment information storage unit 122 shown in FIG. 5B represents the state generated by the slice information collection unit 132 after the occurrence of the failure in the storage device 30*a* in FIG. 2A.

The first row of the segment information storage unit 122 shown in FIG. 5A indicates that a segment with the segment ID "1" in the logical volume ID "A" is formed of the slice (primary) with the slice ID "1001" belonging to the storage device 30*a* and the slice (secondary) with the slice ID "1001" belonging to the storage device 30*b* duplexed with each other.

The first row of the segment information storage unit 122 shown in FIG. 5B indicates that the segment with the segment ID "1" in the logical volume ID "A" is formed of only the slice (secondary) with the slice ID "1001" belonging to the storage device 30*b*. This is because the segment information storage unit 122 shown in FIG. 5B represents the state generated by the slice information collection unit 132 after the occurrence of the failure in the storage device 30*a* in FIG. 2A. Thus, segments formed of only one slice, as well as recovery target slices, can be identified based on the information stored in the segment information storage unit 122. For example, in the case of the segment information storage unit 122 shown in FIG. 5B, the recovery target slices are the slice with the slice ID "1001" belonging to the storage device 30*b*, the slice with the slice ID "1002" belonging to the storage device 30*c*, and the slice with the slice ID "1003" belonging to the storage device 30*d*.

This segment information storage unit 122 consists of structures each made up of three elements: the segment ID, the primary information, and the secondary information. A structure made up of these three elements will herein be called a "segment structure."

The recovery target list 123 is a list that stores pointers to the segment structures containing the recovery target slices. The recovery target list 123 is stored by a recovery target extraction unit 133 to be described later.

The control unit 130 is a control unit that generally controls the control apparatus 40, and it includes a monitoring unit 131, the slice information collection unit 132, the recovery target extraction unit 133, and a duplexing control unit 134.

The monitoring unit 131 is a processing unit that monitors whether or not the storage management apparatuses 20*a* to 20*d* are properly operating. Specifically, when an anomaly notification indicating the occurrence of an anomaly is received from one of the storage management apparatuses 20*a* to 20*d*, the monitoring unit 131 detects the occurrence of the anomaly in the one of the storage management apparatuses 20*a* to 20*d* that has transmitted the anomaly notification. Also, when a proper-operation notification indicating proper operation is not received from one of the storage management apparatuses 20*a* to 20*d* for a certain period, the monitoring unit 131 detects the occurrence of an anomaly in the one of the storage management apparatuses 20*a* to 20*d* that has not transmitted the proper-operation notification for the certain period.

The slice information collection unit 132 is a processing unit that collects the slice information from the properly operating storage management apparatuses 20*a* to 20*d* to reconstruct the slice information storage unit 121 and the segment information storage unit 122 when the occurrence of an anomaly in any of the storage management apparatuses 20*a* to 20*d* is detected by the monitoring unit 131.

For example, when the occurrence of an anomaly in the storage management apparatus 20*a* is detected by the monitoring unit 131 in FIG. 2A, the slice information collection unit 132 collects the slice information from the storage management apparatuses 20*b* to 20*d*. The slice information collection unit 132 then clears the information stored in the slice information storage unit 121 and stores the collected slice information in the slice information storage unit 121. The slice information storage unit 121 at this point is in the state shown in FIG. 4B. The slice information collection unit 132 also clears the information stored in the segment information storage unit 122 and stores, in the segment information storage unit 122, information included in the collected slice information. The segment information storage unit 122 at this point is in the state shown in FIG. 5B.

The recovery target extraction unit 133 is a processing unit that extracts segments partially formed of recovery target slices based on the information stored in the segment information storage unit 122. Specifically, from the segment information storage unit 122, the recovery target extraction unit 133 extracts segment structures in which information is stored in only one of the primary information and the secondary information. The recovery target extraction unit 133 then stores pointers to the extracted segment structures in the recovery target list 123. The recovery target slices can be identified based on the information stored in the primary information or the secondary information in the segment structures extracted by the recovery target extraction unit 133.

For example, in the case where the segment information storage unit 122 is in the state shown in FIG. 5B, the segments with the segment IDs "1" to "3" have information stored only in one of the primary information and the secondary information. Therefore, the recovery target extraction unit 133 stores, in the recovery target list 123, pointers to the segment structures in the first to third rows of the segment information storage unit 122.

The duplexing control unit 134 is a processing unit that controls to duplex a recovery target slice with an unused slice belonging to any properly operating one of the storage management apparatuses 20*a* to 20*d*. Specifically, the duplexing control unit 134 sequentially performs primary conversion processing, free slice assignment processing, and unused slice assignment processing. Each of these processing stages will be described below.

The duplexing control unit 134 first performs the primary conversion processing for making all the recovery target slices primary. Specifically, the duplexing control unit 134 obtains the storage IDs and slice IDs of the recovery target slices from the segment structures to which the pointers stored in the recovery target list 123 point. The duplexing control unit 134 then transmits primary conversion instructions, which are instructions to make the slices corresponding to the obtained slice IDs primary, to the storage management apparatuses 20*a* to 20*d* involving the storage devices 30*a* to 30*d* corresponding to the obtained storage IDs of the recovery target slices.

In the case of the above-described example of FIG. 5B, the duplexing control unit 134 obtains the storage ID "30b" and the slice ID "1001" from the segment structure with the segment ID "1." The duplexing control unit 134 then transmits a primary conversion instruction to make the slice with the slice ID "1001" primary to the storage management apparatus 20*b*. Similarly, the duplexing control unit 134 obtains the storage ID "30c" and the slice ID "1002" from the segment structure with the segment ID "2" and transmits a primary conversion instruction to make the slice with the slice ID "1002" primary to the storage management apparatus 20c. Similarly, the duplexing control unit 134 obtains the storage ID "30d" and the slice ID "1003" from the segment structure with the segment ID "3" and transmits a primary conversion instruction to make the slice with the slice ID "1003" primary to the storage management apparatus 20d.

Subsequently, the duplexing control unit 134 performs the free slice assignment processing. Specifically, the duplexing control unit 134 obtains the data update flag of a recovery target slice from a segment structure to which the first pointer stored in the recovery target list 123 points. If the obtained data update flag is "0 (data unupdated)," the duplexing control unit 134 retrieves, from the slice information storage unit 121, one slice "belonging to one of the storage devices 30a to 30d different from the one to which the recovery target slice belongs," "having its attribute unset," and "having its data update flag set to 0 (data unupdated)."

The duplexing control unit 134 then transmits a free slice assignment instruction, which is an instruction to duplex the retrieved slice (free) with the recovery target slice, to the one of the storage management apparatuses 20a to 20d to which the recovery target slice belongs. The free slice assignment instruction includes the slice ID of the recovery target slice, as well as the storage ID and slice ID of the slice (free) to be duplexed with the recovery target slice.

If a response "processing completed" to the free slice assignment instruction is received from the one of the storage management apparatuses 20a to 20d, the duplexing control unit 134 transmits a secondary conversion instruction, which is an instruction to make the slice (free) to be duplexed with the recovery target slice secondary, to the one of the storage management apparatuses 20a to 20d to which the slice (free) to be duplexed with the recovery target slice belongs. The secondary conversion instruction includes the storage ID, logical volume ID, segment ID, and slice ID of the recovery target slice, as well as the storage ID and slice ID of the slice (free) to be duplexed with the recovery target slice. The duplexing control unit 134 obtains these information items to be included in the secondary conversion instruction from the slice information storage unit 121 and the segment information storage unit 122.

The duplexing control unit 134 then deletes the processed pointer from the recovery target list 123 and performs the above-described free slice assignment processing for the next pointer stored in the recovery target list 123.

If a response "processing uncompleted" is received from the one of the storage management apparatuses 20a to 20d, the duplexing control unit 134 does not delete the pointer being processed from the recovery target list 123 and performs the above-described free slice assignment processing for the next pointer stored in the recovery target list 123.

If the data update flag is "1 (data updated)," the duplexing control unit 134 does not perform the free slice assignment processing for this recovery target slice and performs the above-described free slice assignment processing for the next pointer stored in the recovery target list 123.

Description will be given using the above-described example of FIG. 5B. It is assumed that the slice information storage unit 121 is in the state shown in FIG. 4B. Assuming that the segment structure to which the first pointer stored in the recovery target list 123 points is the segment structure with the segment ID "1," the duplexing control unit 134 obtains the data update flag "1" of the recovery target slice (the storage ID "30b" and the slice ID "1001"). Since the obtained data update flag is "1," the duplexing control unit 134 does not perform the free slice assignment processing for this recovery target slice.

Assuming that the segment structure to which the next pointer stored in the recovery target list 123 points is the segment structure with the segment ID "2," the duplexing control unit 134 obtains the data update flag "0" of the recovery target slice (the storage ID "30c" and the slice ID "1002"). Since the obtained data update flag is "0," the duplexing control unit 134 retrieves one free slice from the slice information storage unit 121. Here, it is assumed that the duplexing control unit 134 retrieves a free slice (the storage ID "30d" and the slice ID "1002") in the 14th row of the slice information storage unit 121 shown in FIG. 4B. The duplexing control unit 134 transmits, to the storage management apparatus 20c, a free slice assignment instruction including the slice ID "1002" of the recovery target slice, as well as the storage ID "30d" and slice ID "1002" of the slice (free) to be duplexed with the recovery target slice.

If a "processing completed" response to this free slice assignment instruction is received from the storage management apparatus 20c, the duplexing control unit 134 transmits, to the storage management apparatus 20d, a secondary conversion instruction including the storage ID "30c," logical volume ID "A," segment ID "2," and slice ID "1002" of the recovery target slice, as well as the storage ID "30d" and slice ID "1002" of the slice (free) to be duplexed with the recovery target slice, in order to make the free slice secondary. The duplexing control unit 134 deletes the pointer to the segment structure with the segment ID "2" from the recovery target list 123.

In this manner, the duplexing control unit 134 performs the above-described free slice assignment processing for all the pointers stored in the recovery target list 123.

Subsequently, the duplexing control unit 134 performs the unused slice assignment processing. Specifically, the duplexing control unit 134 first performs the unused slice assignment processing for a recovery target slice in a segment structure to which the first pointer stored in the recovery target list 123 points. The duplexing control unit 134 retrieves one slice "belonging to one of the storage devices 30a to 30d different from the one to which the recovery target slice belongs" and "having its attribute unset" from the slice information storage unit 121.

The duplexing control unit 134 then transmits an unused slice assignment instruction, which is an instruction to duplex the retrieved slice (free or dirty) with the recovery target slice, to the one of the storage management apparatuses 20a to 20d to which the recovery target slice belongs. The unused slice assignment instruction includes the slice ID of the recovery target slice, as well as the storage ID and slice ID of the slice (free or dirty) to be duplexed with the recovery target slice.

If a "processing completed" response to the unused slice assignment instruction is received from the one of the storage management apparatuses 20a to 20d, the duplexing control unit 134 transmits a secondary conversion instruction to make the slice (free or dirty) to be duplexed with the recovery target slice secondary, to the one of the storage management apparatuses 20a to 20d to which the slice (free or dirty) to be duplexed with the recovery target slice belongs. The duplexing control unit 134 performs the above-described unused slice assignment processing for all the pointers stored in the recovery target list 123.

Figure 6:
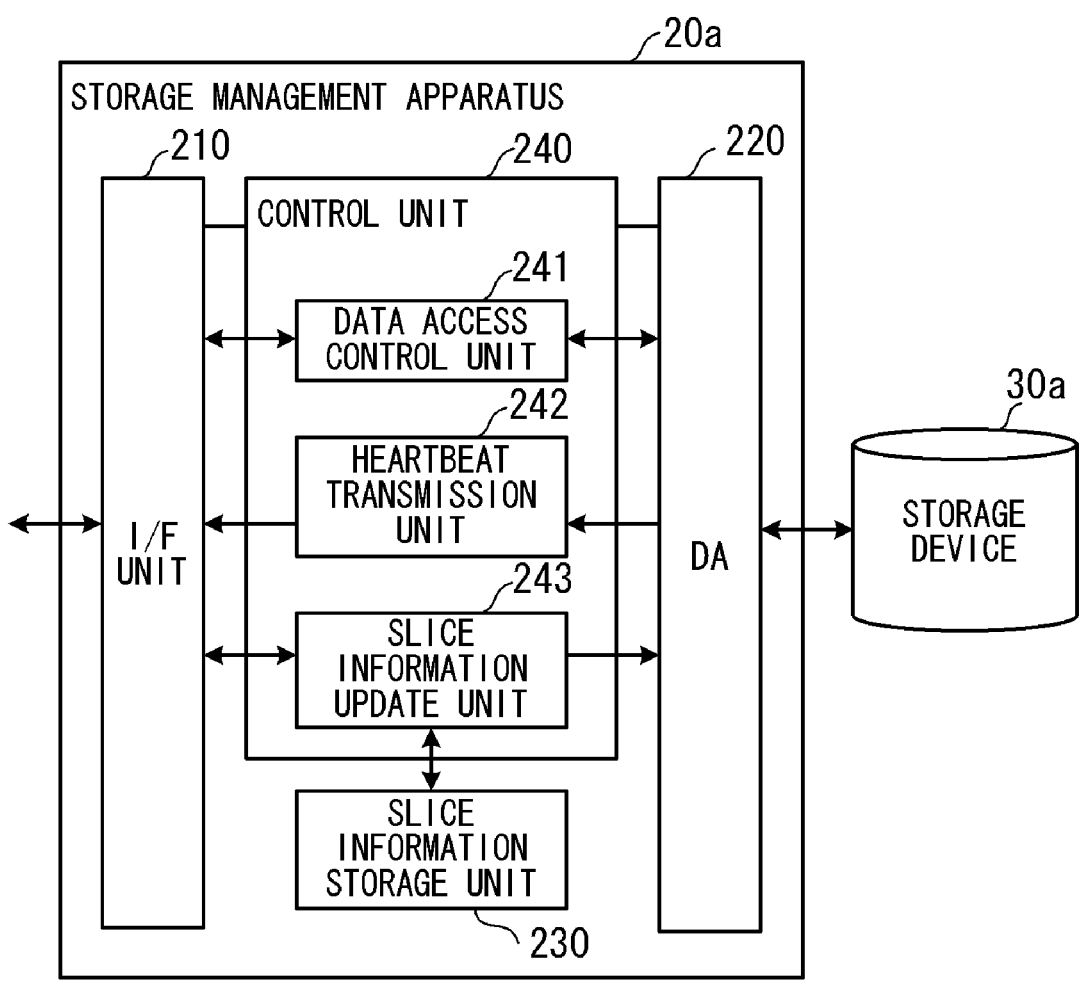
FIG. 6 is a functional block diagram showing the configuration of a storage management apparatus shown in FIG. 1.

Now, the configuration of the storage management apparatus 20a shown in FIG. 1 will be described. FIG. 6 is a functional block diagram showing the configuration of the storage management apparatus 20a shown in FIG. 1. The configuration of the storage management apparatuses 20b to 20d is also the same as that in the functional block diagram shown in FIG. 6.

As shown, the storage management apparatus 20a includes an I/F unit 210, a DA (Device Adapter) 220, a slice information storage unit 230, and a control unit 240.

The I/F unit 210 is an interface device for implementing network communication. The DA 220 is an adapter for connecting the storage management apparatus 20a and the storage device 30a.

The slice information storage unit 230 is a nonvolatile storage medium such as a disk and stores the slice information about the slices belonging to the storage device 30a. The configuration of the slice information storage unit 230 is the same as that of the slice information storage unit 121 shown in FIGS. 4A and 4B.

The control unit 240 is a control unit that generally controls the storage management apparatus 20a, and it includes a data access control unit 241, a heartbeat transmission unit 242, and a slice information update unit 243. The data access control unit 241 retrieves data from the storage device 30a or writes data to the storage device 30a upon reception of a read request or a write request.

The heartbeat transmission unit 242 is a processing unit that transmits the operation state of the storage management apparatus 20a and the storage device 30a to the control apparatus 40. Specifically, when the storage management apparatus 20a and the storage device 30a are properly operating, the heartbeat transmission unit 242 periodically transmits a proper-operation notification to the control apparatus 40, indicating that they are operating properly. On the other hand, when an anomaly occurs in the storage management apparatus 20a and the storage device 30a, the heartbeat transmission unit 242 transmits an anomaly notification to the control apparatus 40, indicating the occurrence of the anomaly.

The slice information update unit 243 is a processing unit that updates the slice information stored in the slice information storage unit 230 upon reception of a primary conversion instruction, free slice assignment instruction, or unused slice assignment instruction from the duplexing control unit 134.

Specifically, upon reception of the primary conversion instruction, the slice information update unit 243 updates the attribute in the slice information storage unit 230 corresponding to the slice ID included in the primary conversion instruction to "primary."

Upon reception of the free slice assignment instruction, the slice information update unit 243 uses "the slice ID of the recovery target slice" included in the free slice assignment instruction as a key to obtain the data update flag from the slice information storage unit 230.

If the obtained data update flag is "0 (data unupdated)," the slice information update unit 243 updates information items in the slice information storage unit 230 corresponding to "the slice ID of the recovery target slice." Specifically, the slice information update unit 243 updates the storage ID in the duplexing counterpart information in the slice information storage unit 230 to "the storage ID of the slice (free) to be duplexed with the recovery target slice" included in the free slice assignment instruction. The slice information update unit 243 also updates the slice ID in the duplexing counterpart information to "the slice ID of the slice (free) to be duplexed with the recovery target slice" included in the free slice assignment instruction. After completion of the update processing for the slice information storage unit 230, the slice information update unit 243 transmits a signal indicating "processing completed" to the control apparatus 40.

If the obtained data update flag is "1 (data updated)," the slice information update unit 243 transmits a signal indicating "processing uncompleted" to the control apparatus 40. Whether or not data is stored in the recovery target slice in this manner is checked for the following reason: since the storage management apparatus 20a accepts write requests even during the duplexing recovery processing, data may be stored in the recovery target slice after the slice information collection unit 132 of the control apparatus 40 has collected the slice information. Even in such a case, checking the data storage state of the recovery target slice can prevent the duplexing processing from being completed until the data stored in the recovery target slice is copied into the free slice.

Upon reception of the secondary conversion instruction, the slice information update unit 243 updates information items in the slice information storage unit 230 corresponding to "the slice ID of the slice to be duplexed with the recovery target slice" included in the secondary conversion instruction. Specifically, the slice information update unit 243 updates the attribute in the slice information storage unit 230 to "secondary," updates the volume ID in the logical volume information to "the logical volume ID of the recovery target slice" included in the secondary conversion instruction, updates the segment ID in the logical volume information to "the segment ID of the recovery target slice" included in the secondary conversion instruction, updates the storage ID in the duplexing counterpart information to "the storage ID of the recovery target slice" included in the secondary conversion instruction, and updates the slice ID in the duplexing counterpart information to "the slice ID of the recovery target slice" included in the secondary conversion instruction.

Upon reception of the unused slice assignment instruction, the slice information update unit 243 updates information items in the slice information storage unit 230 corresponding to "the slice ID of the recovery target slice" included in the unused slice assignment instruction. Specifically, the slice information update unit 243 updates the storage ID in the duplexing counterpart information in the slice information storage unit 230 to "the storage ID of the slice to be duplexed with the recovery target slice" included in the unused slice assignment instruction, and updates the slice ID in the duplexing counterpart information to "the slice ID of the slice to be duplexed with the recovery target slice" included in the unused slice assignment instruction. The slice information update unit 243 then instructs the data access control unit 241 to copy data stored in the recovery target slice into the slice to be duplexed with the recovery target slice. After completion of the copy processing by the data access control unit 241, the slice information update unit 243 transmits a signal indicating "process completed" to the control apparatus 40.

Figure 7A:
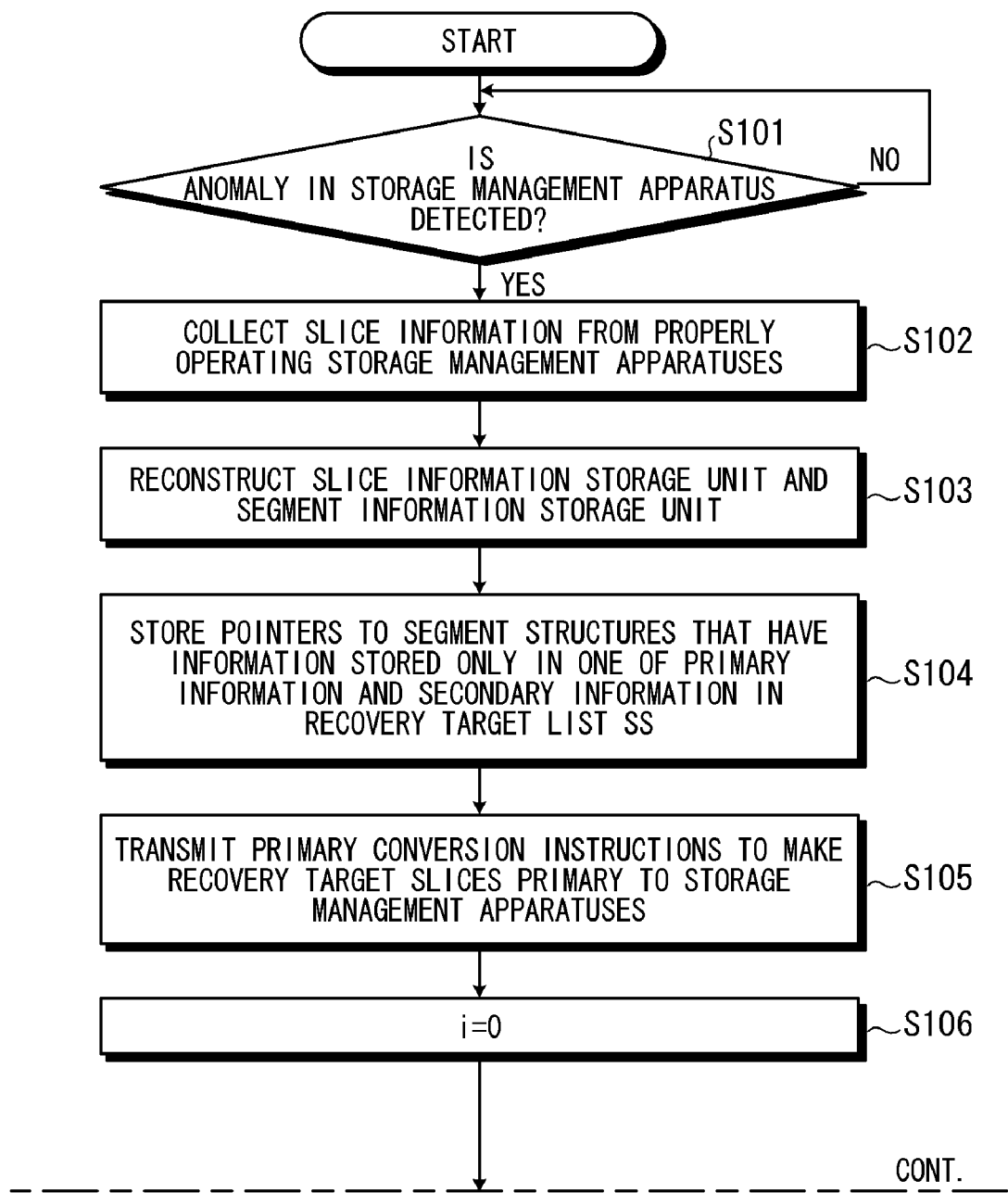

Now, the duplexing recovery processing by the control apparatus 40 shown in FIG. 1 will be described. FIGS. 7A and 7B are a flowchart showing the steps of the duplexing recovery processing by the control apparatus 40 shown in FIG. 1. As shown, when the monitoring unit 131 of the control apparatus 40 detects the occurrence of an anomaly in any of the storage management apparatuses 20a to 20d (Yes in step S101), the slice information collection unit 132 collects the slice information from the properly operating storage management apparatuses 20a to 20d (step S102) and reconstructs the slice information storage unit 121 and the segment information storage unit 122 (step S103).

From the segment information storage unit 122 reconstructed by the slice information collection unit 132, the recovery target extraction unit 133 extracts segment structures that have information stored only in one of the primary information and the secondary information. The recovery target extraction unit 133 stores pointers to the extracted segment structures in a recovery target list SS (step S104). The "recovery target list SS" is the list name of the recovery target list 123.

Based on the segment structures to which the pointers stored in the recovery target list 123 point, the duplexing control unit 134 identifies recovery target slices and transmits primary conversion instructions to make the recovery target slices primary to the storage management apparatuses 20a to 20d to which the recovery target slices belong (step S105).

The duplexing control unit 134 initializes a counter (index) i of the recovery target list SS to 0 (step S106). If the counter i is smaller than the number of pointers stored in the recovery target list SS (Yes in step S107) the duplexing control unit 134 obtains the data update flag of a recovery target slice from a segment structure to which the pointer held in the recovery target list SS [i] points.

If the obtained data update flag is "0 (data unupdated)" (Yes in step S108), the duplexing control unit 134 retrieves a free slice from the slice information storage unit 121 (step S109). To duplex the retrieved free slice with the recovery target slice, the duplexing control unit 134 transmits a free slice assignment instruction to one of the storage management apparatuses 20a to 20d to which the recovery target slice belongs (step S110).

If a response "processing completed" to the free slice assignment instruction is received from the selected one of the storage management apparatuses 20a to 20d (Yes in step S111), the duplexing control unit 134 transmits a secondary conversion instruction to one of the storage management apparatuses 20a to 20d to which the slice (free) to be duplexed with the recovery target slice belongs in order to make the slice (free) to be duplexed with the recovery target slice secondary (step S112). The duplexing control unit 134 deletes the pointer held in the recovery target list SS [i] from the recovery target list SS (step S113).

Subsequently, the duplexing control unit 134 increments the value of the counter i by one (step S114). The duplexing control unit 134 performs the above-described free slice assignment processing (steps S108 to S113) until the counter i becomes equal to or larger than the number of pointers stored in the recovery target list SS (No in step S107).

If the counter i becomes equal to or larger than the number of pointers stored in the recovery target list SS (No in step S107), the duplexing control unit 134 initializes the counter i to 0 (step S115).

Then, if the counter i is smaller than the number of pointers stored in the recovery target list SS (Yes in step S116), the duplexing control unit 134 retrieves a free or dirty slice from the slice information storage unit 121 (step S117).

The duplexing control unit 134 transmits an unused slice assignment instruction to one of the storage management apparatuses 20a to 20d to which the recovery target slice belongs in order to duplex the retrieved slice (free or dirty) with the recovery target slice (step S118). After a response "processing completed" to the unused slice assignment instruction is received from the one of the storage management apparatuses 20a to 20d, the duplexing control unit 134 transmits a secondary conversion instruction to one of the storage management apparatuses 20a to 20d to which the slice (free or dirty) to be duplexed with the recovery target slice belongs in order to make the slice (free or dirty) to be duplexed with the recovery target slice secondary (step S119).

Now, the duplexing recovery processing by the storage management apparatus 20a shown in FIG. 1 will be described. FIGS. 8A and 8B are a flowchart showing the steps of the duplexing recovery processing by the storage management apparatus 20a shown in FIG. 1.

As shown, if a free slice assignment instruction is received (Yes in step S201), the slice information update unit 243 of the storage management apparatus 20a uses "the slice ID of the recovery target slice" included in the free slice assignment instruction as a key to obtain the data update flag from the slice information storage unit 230 (step S202).

If the obtained data update flag is "0 (data unupdated)" (Yes in step S203), the slice information update unit 243 updates information items in the slice information storage unit 230 corresponding to "the slice ID of the recovery target slice" (step S204). After completion of the update processing for the slice information storage unit 230, the slice information update unit 243 transmits a signal indicating "processing completed" to the control apparatus 40 (step S205).

If the obtained data update flag is "1 (data updated)" (No in step S203), the slice information update unit 243 transmits a signal indicating "processing uncompleted" to the control apparatus 40 (step S206).

If an unused slice assignment instruction is received (Yes in step S207), the slice information update unit 243 updates information items in the slice information storage unit 230 corresponding to "the slice ID of the recovery target slice" included in the unused slice assignment instruction (step S208).

The slice information update unit 243 instructs the data access control unit 241 to copy data stored in the recovery target slice into the slice to be duplexed with the recovery target slice (step S209). After completion of the copy processing by the data access control unit 241, the slice information update unit 243 transmits a response indicating "processing completed" to the control apparatus 40 (step S210).

If a secondary conversion instruction is received (Yes in step S211), the slice information update unit 243 updates information items in the slice information storage unit 230 corresponding to "the slice ID of the slice to be duplexed with the recovery target slice" included in the secondary conversion instruction (step S212).

As having been described above, the storage system 1 according to the embodiments determines whether or not data is stored in a recovery target slice. If data is stored, the storage system 1 duplexes the recovery target slice with an unused slice and performs the data copy processing. If no data is stored in the recovery target slice, the storage system 1 duplexes the recovery target slice with the free slice and does not perform the data copy processing. Therefore, the time required for the copy processing can be eliminated. As a result, the time required for the duplexing recovery processing can be reduced.

The above embodiments have illustrated the example in which the duplexing recovery processing is performed when the monitoring unit 131 of the control apparatus 40 detects the occurrence of an anomaly in any of the storage devices 30a to 30d. However, the duplexing recovery processing may be performed at the startup of the storage system 1. Specifically, at the startup of the storage system 1, the slice information collection unit 132 collects the slice information from the storage management apparatuses 20a to 20d that are operating and reconstructs the slice information storage unit 121 and the segment information storage unit 122. Processing by the recovery target extraction unit 133 and the duplexing control unit 134 that follows is the same as in the above-described embodiments. This allows the duplexing recovery processing to be promptly performed in the cases such as where any of the storage management apparatuses 20a to 20d or storage devices 30a to 30d does not start at the startup of the storage system 1.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purpose to aid the reader in understanding the principles of the invention and the concepts contributed by the inventor to furthering the art, and are to be construed as being without limitation to such specifically recited examples and conditions, nor does the organization of such examples in the specification related to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A storage control apparatus that performs control so that storage areas of different storage management apparatuses are duplexed, comprising:
    monitoring unit monitoring whether or not the storage management apparatuses are properly operating;
    recovery target extraction unit extracting a recovery target storage area when the existence of a malfunctioning storage management apparatus is detected by the monitoring unit, the recovery target storage area being a storage area that has been duplexed with a storage area of the malfunctioning storage management apparatus; and
    duplexing control unit performing control so that, if the recovery target storage area extracted by the recovery target extraction unit has no data stored therein, the recovery target storage area is duplexed with a storage area that has no data stored therein and that is unused, and if the recovery target storage area extracted by the recovery target extraction unit has data stored therein, the recovery target storage area is duplexed with a non-duplexed storage area and the data stored in the recovery target storage area is copied into the non-duplexed storage area.

2. The storage control apparatus according to claim 1, wherein if data is stored in the recovery target storage area before the recovery target storage area is duplexed with a storage area that has no data stored therein and that is not duplexed, the duplexing control unit performs control so that the recovery target storage area is duplexed with a non-duplexed storage area and the data stored in the recovery target storage area is copied into the non-duplexed storage area.

3. The storage control apparatus according to claim 1, wherein the recovery target extraction unit extracts the recovery target storage area at the startup of the storage control apparatus.

4. A storage medium having stored thereon a storage control program for performing control so that storage areas of different storage management apparatuses are duplexed, the storage control program causing a computer to perform:
    a monitoring process of monitoring whether or not the storage management apparatuses are properly operating;
    a recovery target extraction process of extracting a recovery target storage area when the existence of a malfunctioning storage management apparatus is detected by the monitoring process, the recovery target area being a storage area that has been duplexed with a storage area of the malfunctioning storage management apparatus; and
    duplexing control process of performing control so that, if the recovery target storage area extracted by the recovery target extraction process has no data stored therein, the recovery target storage area is duplexed with a storage area that has no data stored therein and that is unused, and if the recovery target storage area extracted by the recovery target extraction process has data stored therein, the recovery target storage area is duplexed with a non-duplexed storage area and the data stored in the recovery target storage area is copied into the non-duplexed storage area.

5. The storage control program according to claim 4, wherein if data is stored in the recovery target storage area before the recovery target storage area is duplexed with a storage area that has no data stored therein and that is not duplexed, the duplexing control process performs control so that the recovery target storage area is duplexed with a non-duplexed storage area and the data stored in the recovery target storage area is copied into the non-duplexed storage area.

6. The storage control program according to claim 4, wherein the recovery target extraction process extracts the recovery target storage area at the startup of a storage control apparatus.

7. A storage control method for performing control so that storage areas of different storage management apparatuses are duplexed, comprising:
    a monitoring step of monitoring whether or not the storage management apparatuses are properly operating;
    a recovery target extraction step of extracting a recovery target storage area when the existence of a malfunctioning storage management apparatus is detected by the monitoring step, the recovery target storage area being a storage area that has been duplexed with a storage area of the malfunctioning storage management apparatus; and
    a duplexing control step of performing control so that, if the recovery target storage area extracted by the recovery target extraction step has no data stored therein, the recovery target storage area is duplexed with a storage area that has no data stored therein and that is unused, and if the recovery target storage area extracted by the recovery target extraction step has data stored therein, the recovery target storage area is duplexed with a non-duplexed storage area and the data stored in the recovery target storage area is copied into the non-duplexed storage area.

8. The storage control method according to claim 7, wherein if data is stored in the recovery target storage area before the recovery target storage area is duplexed with a storage area that has no data stored therein and that is not duplexed, the duplexing control step performs control so that the recovery target storage area is duplexed with a non-duplexed storage area and the data stored in the recovery target storage area is copied into the non-duplexed storage area.

9. The storage control method according to claim 7, wherein the recovery target extraction step extracts the recovery target storage area at the startup of a storage control apparatus.

* * * * *